United States Patent Office 3,461,115
Patented Aug. 12, 1969

3,461,115
PROCESS FOR THE MANUFACTURE OF WATER-SOLUBLE MACROMOLECULAR COMPOUNDS CONTAINING HYDROXYL GROUPS
Franz Schwarzer, Wiesbaden, Germany, assignor to Kalle Aktiengesellschaft, Wiesbaden-Biebrich, Germany
No Drawing. Filed Aug. 25, 1964, Ser. No. 392,030
Claims priority, application Germany, Aug. 27, 1963, K 50,656
Int. Cl. C08b 11/08, 13/00
U.S. Cl. 260—232
2 Claims

ABSTRACT OF THE DISCLOSURE

This invention relates to a process for the preparation of a macromolecular compound containing hydroxyl groups which is soluble in water without forming lumps, which process comprises treating the compound in the solid state with about 0.05 to 5 percent by weight of an aliphatic dicarboxylic acid containing 2 to 8 carbon atoms, or a salt or an ester thereof.

---

It is known that the solubility of cellulose ethers in water or in an aqueous medium can be improved by treatment with cross-linking compounds, such as diketones, ketoaldehydes, dialdehydes, halogen aldehydes, dihalogen compounds, diepoxides and halogen epoxides. However, among these compounds only glyoxal has achieved any industrial importance to date.

It is also known that the solubility of polyvinyl alcohol in water can be improved by treating it with formaldehyde or with a monomeric dialdehyde such as glyoxal. However, formaldehyde and glyoxal are volatile and therefore difficult to supply in measured quantities.

The present invention provides a process for the production, without the above-mentioned disadvantages, of macromolecular compounds containing hydroxyl groups that give solutions in water without the formation of lumpy masses. According to the present process, the macromolecular compounds are treated in the solid state with 0.05 to 5 percent by weight of at least one aliphatic dicarboxylic acid containing 2 to 8 carbon atoms and/or salts and/or esters thereof. The present process is applicable for water-soluble macromolecular compounds containing hydroxyl groups; for example, it may be used to manufacture macromolecular carbohydrates that are soluble in water without lump-formation, such as cellulose ethers, cellulose esters, starch ethers, starch esters, modified starches, vegetable gums and their derivatives, alginates and the like, with special advantage if these compounds contain hydroxyalkyl groups. The process may also be applied to polyvinyl alcohols and their water-soluble derivatives, for example to partially etherified and esterified polyvinyl alcohols. The process is very advantageous for the manufacture of hydroxyalkylated celluloses which dissolve in water without lump-formation, or the mixed ethers thereof, for example hydroxyethyl-cellulose, or such hydroxyethylcelluloses as contain, in addition to hydroxyethyl groups, alkyl and/or carboxyalkyl groups linked with oxygen, for example ethylhydroxyethylcellulose. Another very advantageous use is in the manufacture of unsubstituted or substantially unsubstitited polyvinyl alcohols which are soluble in water without lump-formation.

Compounds suitable for improving the solubility of the macromolecular substances are the diesters and monoesters, especially the lower alkyl esters, such as the methyl and ethyl esters, of dicarboxylic acids containing 2 to 8 carbon atoms, e.g., the esters of oxalic, malonic, succinic, glutaric and adipic acid. Instead of the esters, the neutral or acid salts may be used, in which use the nature of the cation concerned does not play a decisive role. In most cases, the alkali metal salts are used for the sake of simplicity. The afore-mentioned dicarboxylic acids may also be used in the free acid form. Furthermore, mixtures of the compounds named may be used. In many cases, particularly good results are obtained with dimethyloxalate and diethyloxalate; these esters also have the advantage that they are inexpensive commercial products available in unlimited quantities.

The dicarboxylic acids, or the salts or esters thereof, are used in an amount of about 0.05 to 5 percent by weight based upon the weight of the macromolecular compound. The optimum amount to be added within these limits depends on the type of the macromolecular compound and on the ultimate use thereof.

It is of advantage to add the dicarboxylic acid, or the dicarboxylic acid derivatives, to the macromolecular compound and to heat the mixture to an elevated temperature ranging from about 50 to 130° C., preferably from 70 to 120° C. This is best done by drying the mixture in air at these temperatures.

The effect of the treatment of the macromolecular compounds with dicarboxylic acids or the salts or esters thereof is probably caused by a minor cross-linking which, depending on the treatment, is completely or substantially reversible, and which causes a delayed swelling, settling down and distribution of the fine particles of the substance in water so that dissolution without lump-formation is achieved.

The desired effect can be demonstrated in a simple manner when a small amount of the macromolecular substance is carefully sprinkled over a water surface. Untreated product floats on the surface, swells quickly and forms lumps, whereas a product obtained by treatment according to this invention sinks and is distributed throughout the solution without lumps. The effect of the treatment on low-viscosity and high-viscosity products can be determined by this method.

More quantitatively, the effect can be recognized when the progress of dissolution is checked by means of a suitable apparatus (e.g. a Brabender Viscograph). The solution curves show, and serve at the same time as a measure of, the delayed swelling. These measurements enable the present process to be performed so that the resulting products have the best solubility for each use. In the case of products of very low viscosity, however, the test of sprinkling, as described above, yields more accurate results.

The degree and speed of the cross-linking depend on the amount of dicarboxylic acid (or derivative thereof) used, the temperature, the treatment time and the pH value. The treatment may be carried out in a weakly alkaline, neutral or acidic medium; the latter accelerates the cross-linking. An acidic medium may be prepared from the free dicarboxylic acid or from an acid salt thereof, or with additional use of other organic or inorganic acids or acid salts thereof. However, the amount of acid or acid salt to be added is limited by the fact that at low pH values a hydrolytic decomposition of the macromolecular compounds occurs and the treated products become insoluble. It is, therefore, of advantage to work at a pH value from 4 to 8, which, if required, can be adjusted by buffering a solution of higher acidity. To avoid the necessity for a subsequent neutralization, it is especially advantageous to work in the neutral range or to use readily volatile acids, for example formic acid. The conditions to be used in each case to achieve optimum results are easy to determine by simple tests. Thus, the optimum temperature—which, as stated above, preferably ranges from 50 to 130° C.—depends on the type of macromolecular compound used and on the pH value.

The present process can be performed in a variety of ways. Liquid agents, for example diethyloxalate, are advantageously diluted with miscible liquids, whereas solid agents, for example dimethyloxalate, advantageously in the form of solutions in suitable organic solvents, are intimately admixed dropwise with the macromolecular compound to be treated, for example in a mixer or kneader. The mixtures or solutions containing the agents may also be added to the macromolecular compound with the aid of mechanical sprayers or as aerosols in the form of fine droplets. Finally, they may also be added to the water-soluble crude product at any stage of the processing sequence.

Suitable diluents or solvents are those liquids or mixtures of liquids that do not dissolve the material to be treated although they may cause it to swell; the liquids advantageously have a low boiling point. Suitable liquids are, for example, lower alcohols such as methanol, isopropanol or n-butanol, or ketones such as acetone and methylethyl ketone. There may also be used mixtures of these liquids with one another or with water. The macromolecular compound to be treated is advantageously used in a finely dispersed form (short fibers or fine granules).

The following examples further illustrate the invention. The cellulose ethers used are identified by their viscosity $\eta$ in centipoises, measured in 2 percent aqueous solution by the Hoppler method.

Example 1

50 grams of commercial, pulverulent polyvinyl alcohol are stirred with a solution of 1 gram of dimethyloxalate in 100 ml. of acetone. The mixture is then suction-filtered and the residue dried at 105° C. When the polyvinyl alcohol treated in this manner is sprinkled over water, it immediately sinks to the bottom and can be stirred without forming lumps, whereas untreated polyvinyl alcohol floats on the water and forms lumps.

Example 2

A solution of 300 mg. of dimethyloxalate in 75 ml. of acetone and 75 ml. of methanol is added dropwise, with stirring, to 150 grams of water-soluble hydroxyethylcellulose of an average particle size of 100μ, having a viscosity of $\eta=4000$ centipoises, in a kneader. The material is then dried for 1 hour at 105° C. in a drying cabinet. Whereas the starting material forms lumps when stirred into water, the product treated by the present process can be stirred into water without forming lumps, takes longer to commence dissolving, but has a shorter overall dissolution time. The fineness of the material is not affected.

Example 3

A sample of hydroxyethylcellulose identical to that used in Example 2 is treated in analogous manner with a solution of 450 mg. of oxalic acid in acetone. The starting material, which forms lumps when stirred into water, is converted by the above treatment into a product that does not form lumps on being stirred into water.

Example 4

1 ml. of diethyloxalate in 100 ml. of acetone is added dropwise, with stirring, to 100 grams of ethyl-hydroxyethylcellulose of viscosity $\eta=1000$ centipoises in a kneader, and the whole is then dried for 1 hour at 105° C. The starting material, which forms lumps when stirred into water, is converted by this treatment into a product that can be stirred into water without forming lumps.

It will be obvious to those skilled in the art that many modifications may be made within the scope of the present invention without departing from the spirit thereof, and the invention includes all such modifications.

What is claimed is:

1. A process for the preparation of a hydroxyethylated cellulose which is soluble in water without forming lumps, which comprises treating the cellulose in the solid state with about 0.05 to 5 percent by weight of at least one treating agent selected from the group consisting of a saturated aliphatic dicarboxylic acid containing 2 to 8 carbon atoms, a salt and an ester thereof, and retaining the treating agent in the cellulose.

2. A hydroxyethylated cellulose which is soluble in water without forming lumps prepared by treating the cellulose in the solid state with about 0.05 to 5 percent by weight of at least one treating agent selected from the group consisting of a saturated aliphatic dicarboxylic acid containing 2 to 8 carbon atoms, a salt and an ester thereof, and retaining the treating agent in the cellulose.

References Cited

UNITED STATES PATENTS

| | | | |
|---|---|---|---|
| 2,352,261 | 6/1944 | Hiatt et al. | 260—225 |
| 3,220,991 | 11/1965 | Martins | 260—91.3 |
| 3,000,741 | 9/1961 | De Pauw | 260—78.4 |

JAMES A. SEIDLECK, Primary Examiner

STANFORD M. LEVIN, Assistant Examiner

U.S. Cl. X.R.

260—78, 91, 209, 214, 233